March 12, 1946.  C. C. VEALE  2,396,399
CHUCKING DEVICE
Filed June 10, 1944
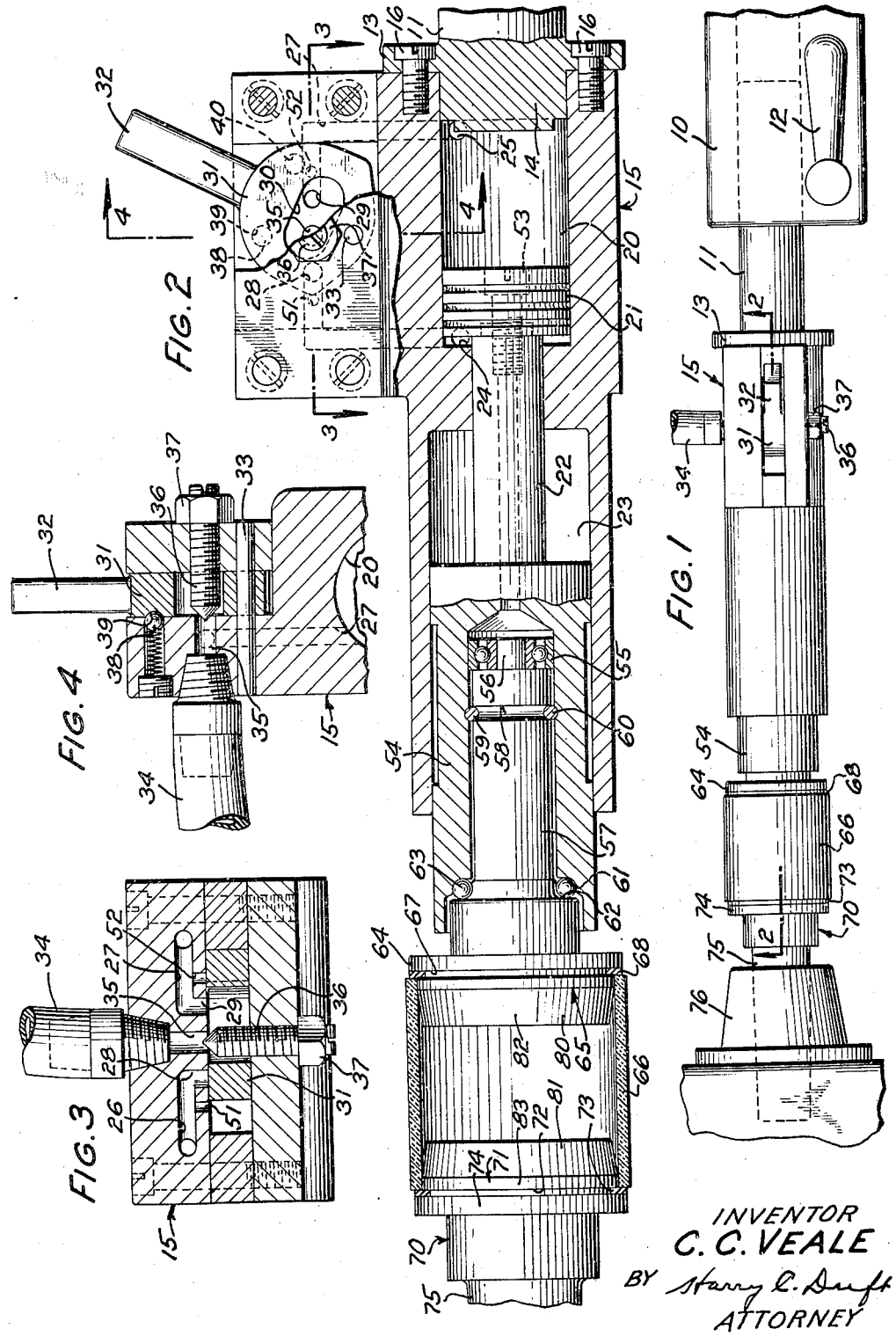
INVENTOR
C. C. VEALE
BY Harry C. Duft
ATTORNEY Patented Mar. 12, 1946

2,396,399

UNITED STATES PATENT OFFICE 2,396,399

CHUCKING DEVICE

Charles C. Veale, Wheaton, Ill., assignor to Western Electric Company, Incorporated, New York, N. Y., a corporation of New York Application June 10, 1944, Serial No. 539,771

4 Claims. (Cl. 82—40)

This invention relates to a chucking device and more particularly to a chucking device for supporting ceramic tubes during the machining thereof prior to the firing of the tubes.

In the manufacture of some ceramic tubes to be used in communications apparatus, it is necessary to machine the outer surfaces of the tubes after they have been partially formed and in the past considerable difficulty has been experienced in so supporting the tubes in a lathe that the edges of the tubes will not be crushed while still holding them with a tight enough grip so that they may be rotated during the machining of them.

It is an object of the present invention to provide a simple and efficient chucking device which will adequately support an article being machined without damage to the article.

In accordance with one embodiment of the invention, a cylinder block is rigidly mounted on the tail stock of a lathe and has a fluid actuatable piston therein for reciprocating a bearing member, which, in turn, has freely rotatable in it a clamping element adapted to engage and resiliently clamp a ceramic tube against a clamping surface of a chuck supported clamping member. By thus supporting the ceramic tube to be machined, the amount of pressure applied to the ends of the tube may be finely regulated.

A complete understanding of the invention may be had by reference to the following detailed description when considered in conjunction with the accompanying drawing, wherein Fig. 1 is a plan view of a portion of a lathe having a chucking device, made in accordance with the present invention, supported thereon;

Fig. 2 is a fragmentary vertical sectional view taken substantially along the line 2—2 of Fig. 1 in the direction of the arrows showing details of construction of the chucking mechanism partly in elevation.

Fig. 3 is a fragmentary plan sectional view taken substantially along the line 3—3 of Fig. 2 in the direction of the arrows showing part of the control mechanism for supplying the fluid to actuate the piston; and Fig. 4 is a fragmentary vertical sectional view taken substantially along the line 4—4 of Fig. 2 in the direction of the arrows showing further details of the control mechanism for controlling the supply of fluid to the piston.

In the drawing, wherein like reference characters designate the same parts throughout the several views, as shown particularly in Fig. 1, a tail stock 10 of a suitable lathe has mounted in it a supporting member 11, which may be locked in position on the tail stock by manipulation of a clamp actuating handle 12, as is usual in such devices. The support member 11 is provided with an annular integrally formed collar or shoulder 13, from which there extends a projection 14, which, in cooperation with the collar or shoulder, serves to support a cylinder block 15 rigidly with respect to the tail stock 10. The cylinder block 15 may be fixed to the support member 11 in any suitable manner, for example, by machine screws 16 extending through the shoulder 13 and threaded into the cylinder block 15.

The cylinder block 15 has a cylindrical cavity 20 formed in it, the right end of which is closed by the projection 14. In this cavity 20, a piston 21 is mounted for reciprocation and the piston 21 carries a piston rod 22, which, in turn, is reciprocable in a cylindrical cavity 23 coaxial with the cavity 20. Fluid under pressure may be admitted to either end of the cavity 20 through ports 24 and 25 at the ends of passages 26 and 27, respectively. The passages 26 and 27 terminate in valve ports 28 and 29, with which a feed cavity 30 formed in a valve member 31 may be alternately associated. The valve member 31 is provided with a handle 32, whereby it may be rocked about a pivot pin 33 to move its cavity 30 into association with either the port 28 or the port 29. Fluid under pressure from a suitable source is connected through a hose connection 34 to a port 35 in the block 15 and thence into the cavity 30. The orifice of the port 35 may be adjusted by means of a needle valve member 36, which is threaded into the block 35 and locked in place by means of a lock nut 37, thus to regulate the flow of fluid into the cavity 30. The valve member 31 may be set in either of two positions and will be held in its adjusted position by means of a spring-pressed ball 38 engaging in either one of a pair of depressions 39 or 40 formed in the valve member. The configuration of the body of the valve member 31 is such that when the valve member is in the position shown in Fig. 2, a bleeder port 51, in communication with the passage 26, will be open to the atmosphere and will thus permit fluid under pressure to escape from the left end of the cylindrical cavity 20, whereas a bleeder port 52, in communication with the passage 27, will be blocked by the surface of the body of the valve 31. When the handle 32 is moved counter-clockwise (Fig. 2) to its opposite position, the cavity 30 will be in communication with the port 28, the bleeder port 51 will be blocked and bleeder port 52 will be open to the atmosphere. In this manner, fluid under a pressure regulated by the needle valve 36 may be supplied to either end of the cylindrical cavity 20 to shift the piston 21 from one end of the cavity 20 to the other.

The piston rod 22 is fixed to piston 21 by means of the machine screw 53 and the piston rod has a bearing sleeve 54 formed at its left end (Fig. 2). This bearing sleeve on the piston rod will bear against and slide in the cavity 23. Mounted in the bearing sleeve 54 is a bearing race 55, which rotatably supports a reduced end portion 56 of a clamping member 57. The clamping member 57 is provided with an annular groove 58, into which a pair of retainer pins 59 and 60 extend for preventing the clamping member 57 from moving to the left with respect to the bearing sleeve 54. Cooperating shoulders 61 and 62 formed on the sleeve 54 and clamping member 57 cooperate with ball bearings 63 to form a thrust bearing for absorbing the thrust applied to the clamping member when the clamping member is actuated.

Adjacent the left end of the clamping member 57 there is formed an annular shoulder 64, which cooperates with an internal support 65 formed integrally therewith to accurately position a ceramic tube 66 in the apparatus. Intermediate the internal support 65 and the shoulder 64 there is formed an annular groove 67, in which a ring 68 of compressible material, for example, rubber, may be set which will engage the edge of the ceramic tube 66 to force it toward a clamping member 70. The clamping member 70 is constructed similarly to the clamping member 57 in that it has an internal support 71, an annular groove 72, a rubber ring 73 and a shoulder 74 of exactly the same construction as those provided on the clamping member 65. However, the clamping member 70 is provided with a shank 75 adapted to be clamped in a driving chuck 76 of the lathe. The driving chuck 76 of the lathe may be driven in any suitable manner to impart rotation to the clamping member 70 and since the clamping member 70 will be connected through the ceramic tube 66 to the clamping member 57, clamping member 57 will be rotated when a tube 66 is in place between the clamping members and the piston 53 is in its lefthand position, as shown in the drawing.

The internal supports 65 and 71 are tapered at their free ends, as shown in Fig. 2 at 80 and 81, to facilitate the loading of a tube 66 thereon. However, when the clamping member 57 moves to clamping position, the inner surfaces of the tube will rest on the plain cylindrical surfaces 82 and 83 of supports 65 and 71, respectively.

In the operation of the apparatus, a ceramic tube 66 may be placed against the ring 68 and encircling the internal support 65 of the clamping member 57 and then the clamping member 57 may be advanced to the position shown by the proper manipulation of the handle 32. The rate at which the clamping member 57 will be advanced towards the clamping member 70 and the pressure under which the two clamping members will grip the tube 66 may be regulated by adjusting the needle valve 36. After turning operations have been performed on the tube 66, it may be removed from the lathe by manipulating the handle 32 to direct the fluid under pressure to the left end of the cavity 20, thus to drive the piston 21 to the right and thereby disengage the tube from the driving clamping member 70.

What is claimed is:

1. In an apparatus for machining frangible tubular ceramic blanks, a pair of cooperating clamping members, means for imparting relative movement to said clamping members to clamp a blank between them, cooperating cylindrical projections on the clamping members for engaging the internal surface of a blank, and resilient rings surrounding said projections to grippingly engage the edges of the blank when the clamping means are in operative position.

2. In an apparatus for machining frangible tubular ceramic blanks, a pair of cooperating clamping members, means for imparting relative movement to said clamping members to clamp a blank between them, cooperating cylindrical projections on the clamping members for engaging the internal surface of a blank, resilient rings surrounding said projections to grippingly engage the edges of the blank when the clamping means are in operative position, and means for applying a selected amount of pressure to said movement imparting means.

3. In an apparatus for machining tubular ceramic blanks, a pair of cooperating clamping members, means for imparting relative movement to said clamping members to clamp a blank between them, cooperating cylindrical projections on the clamping members for engaging the internal surface of a blank, resilient rings surrounding said projections to grippingly engage the edges of the blank when the clamping means are in operative position, means for applying a selected amount of pressure to said movement imparting means including a piston, and a needle valve for regulating the flow of fluid to said piston.

4. In an apparatus for machining tubular ceramic blanks, a pair of cooperating clamping members, means for imparting relative movement to said clamping members to clamp a blank between them, cooperating cylindrical projections on the clamping members for engaging the internal surface of a blank, resilient rings surrounding said projections to grippingly engage the edges of the blank when the clamping means are in operative position, means for applying a selected amount of pressure to said movement imparting means including a stationary support, a piston slidable in said support, a bearing member actuatable by said piston and supporting one of said clamping members for free rotation, and means for regulating the flow of fluid to the piston.

CHARLES C. VEALE.